United States Patent
Hwang et al.

(10) Patent No.: US 9,487,628 B2
(45) Date of Patent: Nov. 8, 2016

(54) MERCAPTO-BASED POLYSILSESQUIOXANE AND METHOD FOR PREPARING FUNCTIONAL POLYSILSESQUIOXANE USING THE SAME

(71) Applicant: KOREA INSTITUTE OF SCIENCE AND TECHNOLOGY, Seoul (KR)

(72) Inventors: Sueng Sang Hwang, Seoul (KR); Soon Man Hong, Seoul (KR); Kyung Youl Baek, Seoul (KR); Chong Min Koo, Seoul (KR); Albert Sung Soo Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/550,887

(22) Filed: Nov. 21, 2014

(65) Prior Publication Data
US 2016/0083526 A1    Mar. 24, 2016

(30) Foreign Application Priority Data
Sep. 23, 2014  (KR) .................. 10-2014-0126871

(51) Int. Cl.
  *C08G 77/442*    (2006.01)
  *C08G 77/28*    (2006.01)

(52) U.S. Cl.
  CPC ............. *C08G 77/442* (2013.01); *C08G 77/28* (2013.01)

(58) Field of Classification Search
  None
  See application file for complete search history.

(56) References Cited

U.S. PATENT DOCUMENTS

2016/0039961 A1* 2/2016 Bowman ............... C08F 228/02
525/205

FOREIGN PATENT DOCUMENTS

| KR | 10-0954677 | 4/2010 |
|---|---|---|
| KR | 10-2010-0134578 | 12/2010 |
| KR | 10-2013-0125224 | 11/2013 |

OTHER PUBLICATIONS

"Hybrid Organic/Inorganic Thiol-Ene-Based Photopolymerized Networks" authored by Schreck et al., and published in Macromolecules (2011), 44, 7520-7529.*
"Preparation of Polysilsesquioxane Grafted Thwermoresponsive Polymer by Use of Mercapto Group" authored by Moriya et al. and published in Polymer (2006) 47, 1837-1844.*
Abstract for CN 102167831 (Aug. 2011).*
Abstract for KR 2013125224 (Nov. 2013).*
Nair et al., The Thiol-Michael Addition Click Reation: A Powerful and Widely Used Tool in Materials Chemistry, Chem. Mater., 2014, 724-744, vol. 26, No. 1.
Yamamoto, et al., Graft Polymerizaiton of Dimethylacrylamide onto Polysilsesquioxane Containing Mercapto Groups, Polymer Journal, Sep. 15, 2004, pp. 761-768, vol. 36, No. 9.

* cited by examiner

*Primary Examiner* — Marc Zimmer
(74) *Attorney, Agent, or Firm* — Goldilocks Zone IP Law

(57) ABSTRACT

Provided is a mercapto-based polysilsesquioxane having a thiol group (—SH) introduced to at least one side chain of polysilsesquioxane, represented by the following Chemical Formula 1 (In Chemical Formula 1, each of $R_1$, $R_2$ and $R_3$ is independently selected from the group consisting of a thiol aromatic group, thiol aliphatic group and organic functional group, wherein at least one of $R_1$, $R_2$ and $R_3$ is a thiol aromatic group or thiol aliphatic group, and n is an integer of 1-10,000).

[Chemical Formula 1]

14 Claims, 14 Drawing Sheets

MERCAPTO-BASED POLYSILSESQUIOXANE AND METHOD FOR PREPARING FUNCTIONAL POLYSILSESQUIOXANE USING THE SAME

CROSS-REFERENCE TO RELATED APPLICATION

This application claims priority to Korean Patent Application No. 10-2014-0126871, filed on Sep. 23, 2014, and all the benefits accruing therefrom under 35 U.S.C. §119, the contents of which in its entirety are herein incorporated by reference.

BACKGROUND

1. Field

The present disclosure relates to a mercapto-based polysilsesquioxane and a method for preparing a functional polysilsesquioxane using the same.

2. Description of the Related Art

Polymer materials according to the related art have formed a big market as general-purpose materials by virtue of their advantages such as light weight, flexibility and mass producibility. However, as the need of a market for functional materials increases, it is required to conduct research and development toward designs of active functions and improvement in limited physical properties, such as thermal, mechanical and electrical properties, of conventional polymers. On the other hand, inorganic materials such as silica have excellent heat resistance and mechanical properties, but have no flexibility, show poor moldability and are not amenable to various functionalization due to the lack of organic functional groups. To solve the above-mentioned problems, many attentions have been given to development of organic/inorganic hybrid materials having a hybridized structure of organic materials and inorganic materials through a suitable structural design. In preparing an organic/inorganic hybrid material, it is important to have no problem in compatibility between an organic monomer or polymer and an inorganic monomer or polymer and to ensure stability. As one of the materials satisfying such a scientific need, highly heat resistant polysilsesquioxane that has been suggested to date through many articles and patents has been spotlighted. Particularly, a polysilsesquioxane-based material has been used widely in heat-resistant materials, weather-resistant materials, impact-resistant materials, wrapping materials, sealing materials, insulating materials, lubricants, release agents, semi-gas permeable coating agents and flexible substrates in the form of oil, rubber, resin, or the like. In addition, a polysilsesquioxane-based material has been regarded as one of the most important polymers in various industrial fields.

Meanwhile, in the case of photocurable polymer resins that have been known to date, photocuring has been carried out by adding a photoinitiator to perform photocuring by UV light irradiation as shown in the following reaction scheme.

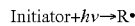

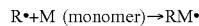

This is because it is difficult for a polymer structure to generate radicals and ions spontaneously by nature. Therefore, it is required to add a photoinitiator capable of generating radicals in the presence of UV rays at a relatively low level. As a result, an additional material is needed to carry out photocuring, resulting in a complicated process. Moreover, it is not easy to carry out photocuring by irradiating UV rays under a general condition.

SUMMARY

The present disclosure is directed to providing a ladder-like mercapto-based polysilsesquioxane having a thiol group (—SH) introduced to the side chain thereof, and a method for preparing a functional polysilsesquioxane including subjecting the thiol group thus introduced to a secondary reaction, such as thiol-ene reaction or oxidation reaction.

In one aspect, there is provided a mercapto-based polysilsesquioxane having a thiol group (—SH) introduced to at least one side chain of polysilsesquioxane, represented by the following Chemical Formula 1:

[Chemical Formula 1]

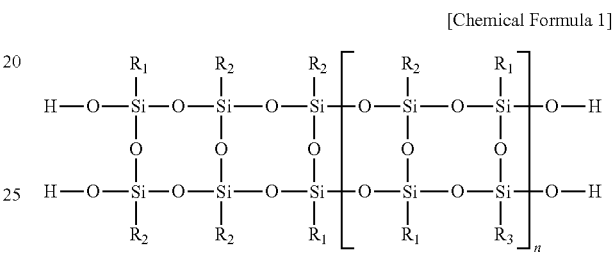

(In Chemical Formula 1, each of $R_1$, $R_2$ and $R_3$ is independently selected from the group consisting of a thiol aromatic group, thiol aliphatic group and organic functional group, wherein at least one of $R_1$, $R_2$ and $R_3$ is a thiol aromatic group or thiol aliphatic group, and n is an integer of 1-10,000).

According to an embodiment, each of $R_1$, $R_2$ and $R_3$ may be independently selected from the group consisting of a thiol aromatic group, thiol aliphatic group, alkyl group, allyl group, vinyl group, epoxy group, amine group, halogen, alkyl halogen, methacryl group and acryl group, wherein at least one of $R_1$, $R_2$ and $R_3$ is a thiol aromatic group or thiol aliphatic group.

According to another embodiment, at least one of $R_1$, $R_2$ and $R_3$ may have mercaptopropyl.

According to still another embodiment, the mercapto-based polysilsesquioxane may be a homopolymer or copolymer having a regular ladder-like structure.

In another aspect, there is provided a method for preparing a ladder-like thioether-containing polysilsesquioxane, including carrying out thiol-ene click reaction of the mercapto-based polysilsesquioxane with a functional reactant.

According to an embodiment, the functional reactant may be an unsaturated hydrocarbon.

According to another embodiment, the functional reactant may be at least one selected from the group consisting of compounds including olefin-based, diene-based, styrene-based, acrylate-based, methacrylate-based, vinyl-based and allyl-based monomers.

According to still another embodiment, the thiol-ene click reaction may be initiated by heat or light.

In still another aspect, there is provided a method for preparing a ladder-like polysilsesquioxane-graft polymer, including carrying out thiol-ene photopolymerization using the mercapto-based polysilsesquioxane.

According to an embodiment, an unsaturated hydrocarbon may be used in the thiol-ene photopolymerization as a functional reactant.

According to another embodiment, the unsaturated hydrocarbon may be at least one selected from the group consisting of olefin-based, diene-based, styrene-based, acrylate-based, methacrylate-based, vinyl-based and allyl-based monomers.

In still another aspect, there is provided a method for preparing a ladder-like sulfur trioxide-containing polysilsesquioxane, including carrying out oxidation using the mercapto-based polysilsesquioxane.

In yet another aspect, there is provided a method for producing a thiol-ene curable composite membrane, including curing a mixture of the mercapto-based polysilsesquioxane and a polysilsesquioxane having an unsaturated hydrocarbon group.

According to an embodiment, the polysilsesquioxane having an unsaturated hydrocarbon group may be represented by the following Chemical Formula 2 and have at least one unsaturated hydrocarbon group introduced to the side chain thereof:

[Chemical Formula 2]

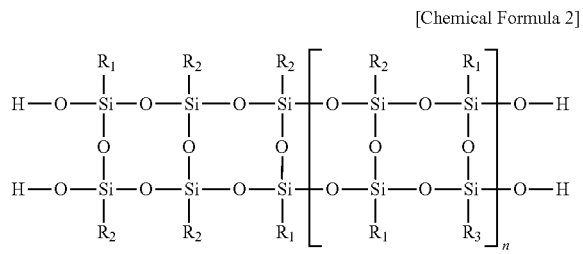

(In Chemical Formula 2, at least one of $R_1$, $R_2$ and $R_3$ is independently selected from the group consisting of organic functional groups including vinyl, allyl, methacrylate and acrylate, wherein at least one of $R_1$, $R_2$ and $R_3$ is an unsaturated hydrocarbon group, and n is an integer of 1-10,000).

According to an embodiment, at least one of $R_1$, $R_2$ and $R_3$ may be methacryloxypropyl.

According to another embodiment, the curing may be carried out by photocuring or thermal curing.

According to the mercapto-based polysilsesquioxane disclosed herein, it is possible to provide a functional material containing various functional groups as compared to an inorganic material. The functional material allows spontaneous photocuring without any photoinitiator, forms a film through a simple process of UV irradiation, and shows significantly improved mechanical properties, such as high strength, high heat resistance, high transparency, flexibility, high refractive index and low heat expanding property, as well as excellent gas barrier property. In addition, the functional material may be used as a light-weight material applicable to a display substrate.

DETAILED DESCRIPTION

Figure 1:
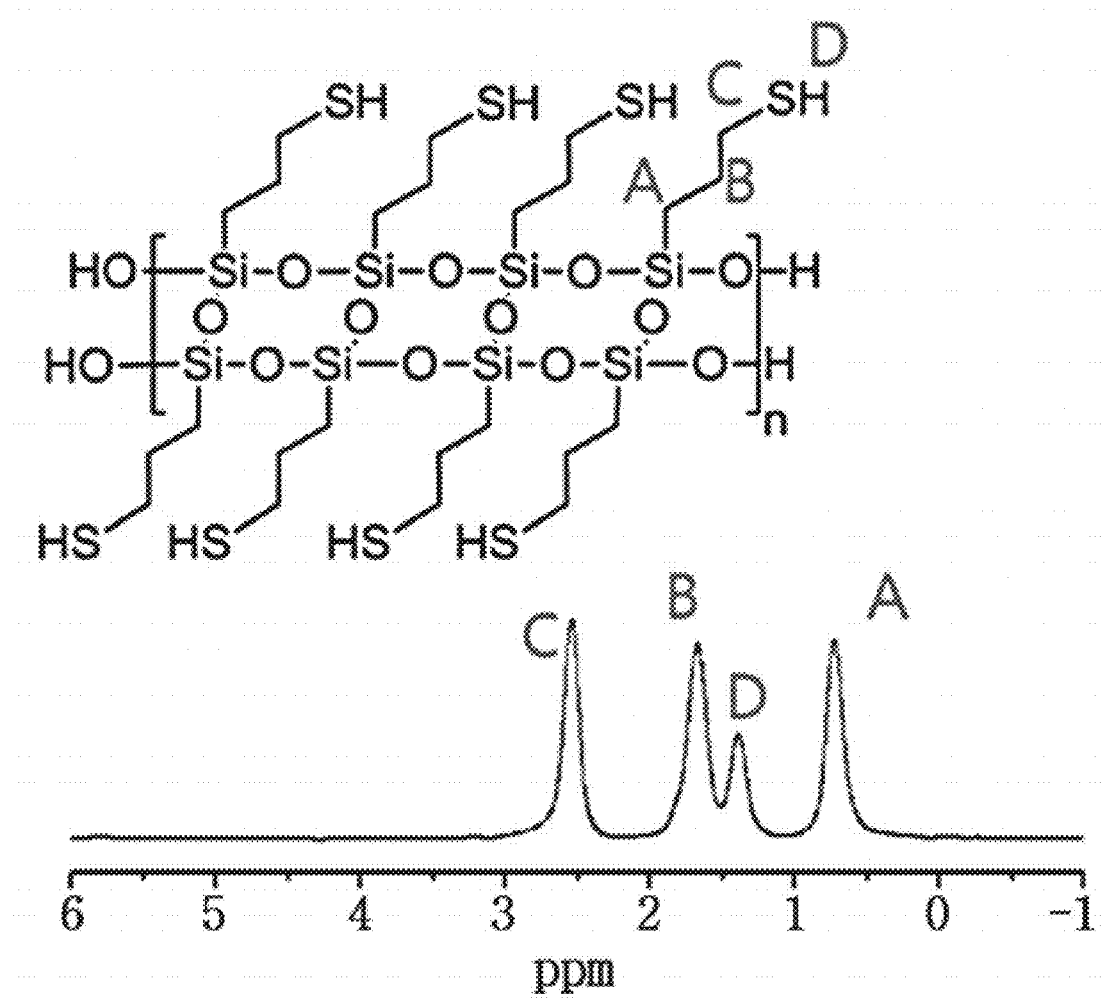
FIG. 1 shows the results of $^1$H NMR analysis of mercapto-based polysilsesquioxane according to an embodiment.

Hereinafter, specific embodiments of the present disclosure are described in detail so that those of ordinary skill in the art to which the present disclosure belongs can easily carry out the present disclosure.

In one aspect, there is provided a mercapto-based polysilsesquioxane having a thiol group (—SH) introduced to at least one side chain of polysilsesquioxane, represented by the following Chemical Formula 1:

[Chemical Formula 1]

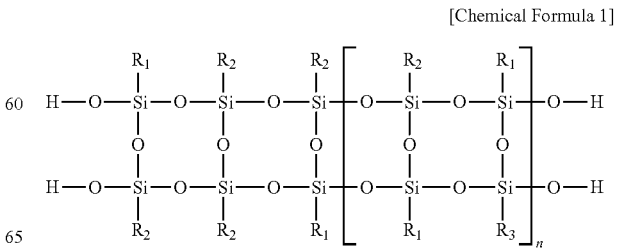

(In Chemical Formula 1, each of $R_1$, $R_2$ and $R_3$ is independently selected from the group consisting of a thiol aromatic group, thiol aliphatic group and organic functional group, wherein at least one of $R_1$, $R_2$ and $R_3$ is a thiol aromatic group or thiol aliphatic group, and n is an integer of 1-10,000).

Herein, the thiol (—SH) group may be at least one of a thiol aromatic group or thiol aliphatic group, particularly a C1-C20 thiol aromatic group or thiol aliphatic group, but is not limited thereto.

Particularly, the thiol aromatic group may be 1-benzyl thiol, naphthalene 1-thiol, anthracene 1-thiol, or the like, but is not limited thereto.

In addition, the thiol aliphatic group may have 1-20 carbon atoms in its aliphatic moiety, and particular examples thereof may include propylthiol, butylthiol or hexylthiol, but are not limited thereto.

As used herein, the organic functional group may be a phenyl group, C1-C20 aliphatic hydrocarbon group, aliphatic carbocyclic ether group, aromatic hydrocarbon group, allyl group, acyl group, amine group, halogen, alkyl halogen, methacryl group, acryl group, hydroxyl group, carboxyl group or nitro group, and particularly may be selected from the group consisting of an alkyl group, allyl group, vinyl group, amine group, halogen, alkyl halogen, methacryl group and acryl group, but is not limited thereto.

Particularly, each of $R_1$, $R_2$ and $R_3$ may be independently selected from the group consisting of a thiol aromatic group, thiol aliphatic group, alkyl group, allyl group, vinyl group, epoxy group, amine group, halogen, alkylhalogen, methacryl group and acryl group, wherein at least one of $R_1$, $R_2$ and $R_3$ is a thiol aromatic group or thiol aliphatic group.

More particularly, at least one of $R_1$, $R_2$ and $R_3$ may have mercaptopropyl, but is not limited thereto.

As used herein, the term 'aliphatic' is an opposite concept to 'aromatic', and means a group, compound, or the like, having no aromaticity.

As used herein, the term 'alkyl group' is a linear or branched C1-C30 alkyl group such as methyl, ethyl, propyl, isopropyl, butyl, isobutyl and t-butyl, and also includes a C3-C10 cycloalkyl group such as cyclopropyl, cyclopentyl or cyclohexyl.

As used herein, the term 'allyl group' is a functional group represented by the formula of $H_2C=CH-CH_2-$, such as allyl alcohol or allyl ether.

As used herein, the term 'vinyl group' is a functional group represented by $CH_2=CH-$, such as vinyl chloride, vinyl acetate, acrylic acid or styrene.

As used herein, the term 'alkylhalogen' is a group whose alkyl group is partially or totally substituted with a halogen atom, wherein the halogen atom includes a fluorine atom, chlorine atom, bromine atom and iodine atom.

Herein, the mercapto-based polysilsesquioxane may be a homopolymer or copolymer having a regular ladder-like structure.

The mercapto-based polysilsesquioxane may have a number average molecular weight of 1,000-100,000.

In another aspect, there is provided a method for preparing a ladder-like thioether-containing polysilsesquioxane, including carrying out thiol-ene click reaction of the mercapto-based polysilsesquioxane with a functional reactant.

The functional reactant may be an unsaturated hydrocarbon. Particularly, the functional reactant may be at least one selected from the group consisting of compounds including olefin-based, diene-based, styrene-based, acrylate-based, methacrylate-based, vinyl-based and allyl-based monomers, but is not limited thereto.

In addition, the functional reactant of unsaturated hydrocarbon may be at least one anhydride monomer selected from the group consisting of maleic anhydride, itaconic anhydride, citraconic anhydride and aconitic anhydride. Derivatives of each anhydride may also be included in the anhydride. For example, such derivatives include dimethylmaleic anhydride.

When mixing the mercapto-based polysilsesquioxane represented by Chemical Formula 1 as disclosed herein with the functional reactant, thiol-ene click reaction may be initiated by heat or light. Particularly, upon light irradiation, it is possible to carry out spontaneous photocuring without any photoinitiator. Thus, it is possible to carry out the reaction merely by a simple process of light irradiation.

As the thiol-ene click reaction of mercapto-based polysilsesquioxane represented by Chemical Formula 1, a secondary reaction initiated by heat or light may be represented by the following Reaction Scheme 1:

[Reaction Scheme 1]

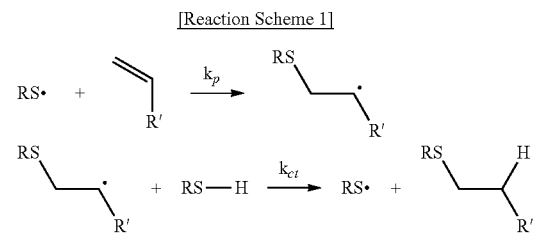

(wherein RS is an aliphatic or aromatic thiol, $K_p$ means the propagation reaction rate constant in the radical reaction, and $K_{ct}$ means the chain transfer reaction rate constant in the radical reaction).

The ladder-like thioether-containing polysilsesquioxane thus obtained is a functional polysilsesquioxane to which an organic functional group is introduced, and is applicable to various functional materials.

In addition, as the thiol-ene photocrosslinking reaction of mercapto-based polysilsesquioxane represented by Chemical Formula 1, a grafting process of organic polymer may be represented by the following Reaction Scheme 2:

[Reaction Scheme 2]

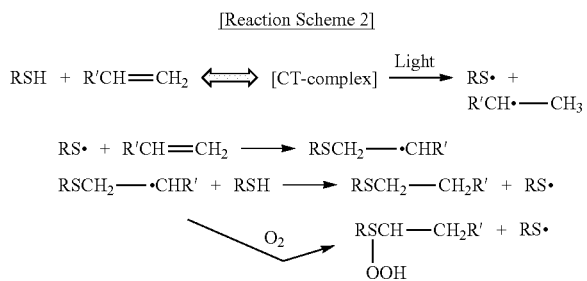

(wherein CT-complex represents a charge transfer complex).

Herein, the thiol-ene click reaction is performed when each of the number of functional groups of organic unsaturated carbons and that of thiol groups in the molecule is 1 (i.e., 1 eq.), while the thiol-ene photocrosslinking reaction is performed when each of the number of organic unsaturated carbons and thiol groups in the molecule is 2 or more (i.e., 2 eq. or more).

In still another aspect, there is provided a method for preparing a ladder-like polysilsesquioxane-graft polymer, including carrying out thiol-ene photopolymerization using the mercapto-based polysilsesquioxane.

According to an embodiment, an unsaturated hydrocarbon may be used in the thiol-ene photopolymerization as a functional reactant.

According to another embodiment, the unsaturated hydrocarbon may be at least one selected from the group consisting of olefin-based, diene-based, styrene-based, acrylate-based, methacrylate-based, vinyl-based and allyl-based monomers.

In still another aspect, there is provided a method for preparing a ladder-like sulfur trioxide-containing polysilsesquioxane, including carrying out oxidation using the mercapto-based polysilsesquioxane. An exemplary method for preparing a ladder-like sulfur trioxide-containing polysilsesquioxane through oxidation using the mercapto-based polysilsesquioxane may be represented by the following Reaction Scheme 3:

[Reaction Scheme 3]

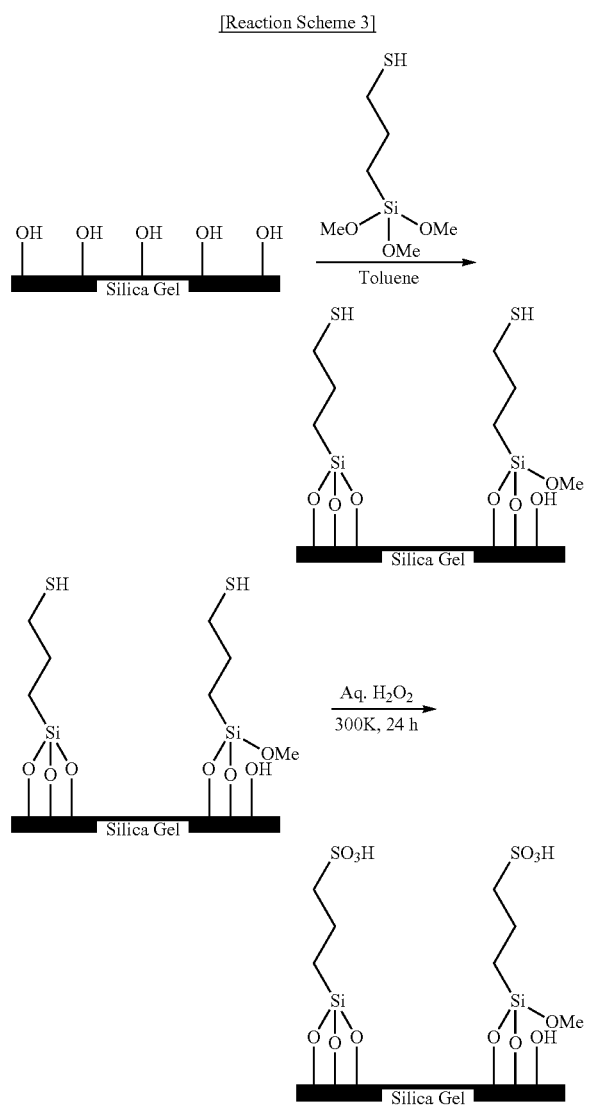

The ladder-like sulfur trioxide-containing polysilsesquioxane thus obtained is a functional polysilsesquioxane to which an organic functional group is introduced, and is applicable to various functional materials.

In yet another aspect, there is provided a method for producing a thiol-ene curable composite membrane, including curing a mixture of the mercapto-based polysilsesquioxane and polysilsesquioxane having an unsaturated hydrocarbon group.

The polysilsesquioxane having an unsaturated hydrocarbon group may be represented by the following Chemical Formula 2 and have at least one unsaturated hydrocarbon group introduced to the side chain thereof:

[Chemical Formula 2]

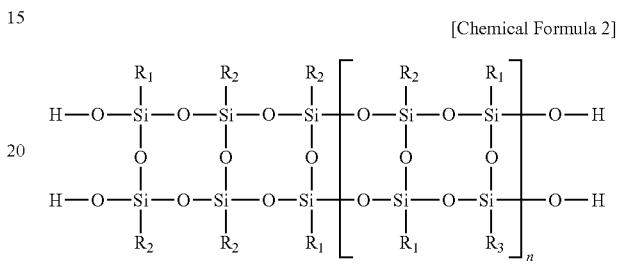

(In Chemical Formula 2, at least one of $R_1$, $R_2$ and $R_3$ is independently selected from the group consisting of organic functional groups including vinyl, allyl, methacrylate and acrylate, wherein at least one of $R_1$, $R_2$ and $R_3$ is an unsaturated hydrocarbon group, and n is an integer of 1-10,000).

Particularly, at least one of $R_1$, $R_2$ and $R_3$ may be methacryloxypropyl, but is not limited thereto.

For example, the polysilsesquioxane having an unsaturated hydrocarbon group may be methacrylate-based polysilsesquioxane, which may be a homopolymer or copolymer.

The thiol-ene curable composite membrane disclosed herein may be obtained by photocuring or thermal curing of a mixture of the mercapto-based polysilsesquioxane represented by Chemical Formula 1 and polysilsesquioxane having an unsaturated hydrocarbon group.

For example, as shown in the following Reaction Scheme 4, when the mercapto-based polysilsesquioxane represented by Chemical Formula 1 is mixed and combined with methacrylate-based polysilsesquioxane, grafting of organic polymer occurs due to thiol-ene crosslinking, and then the graft polymer may be cured to obtain a thiol-ene curable composite membrane.

[Reaction Scheme 4]

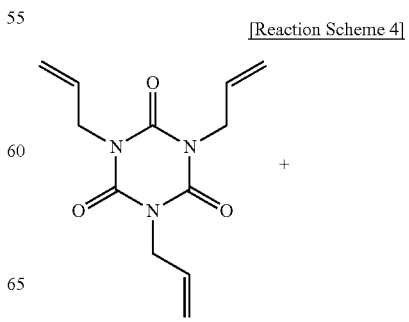

-continued

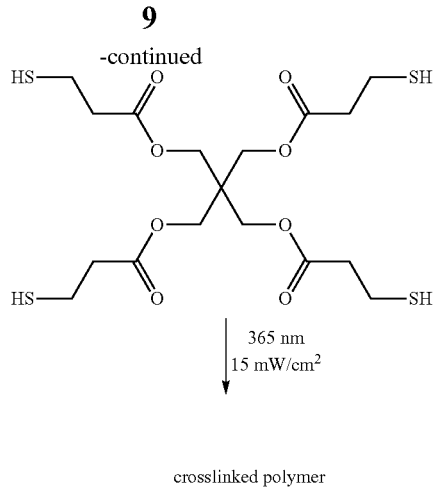

crosslinked polymer

According to some embodiments, the ladder-like mercapto-based polysilsesquioxane represented by Chemical Formula 1 is provided, and a method for introducing an organic functional group to the ladder-like mercapto-based polysilsesquioxane through organic modification is further provided. In addition, it is possible to provide an organic/inorganic hybrid material having a low heat expansion coefficient and excellent properties by forming a composite membrane through thiol-ene photocuring.

The examples and experiments will now be described. The following examples and experiments are for illustrative purposes only and not intended to limit the scope of the present disclosure.

Example 1

Figure 2:
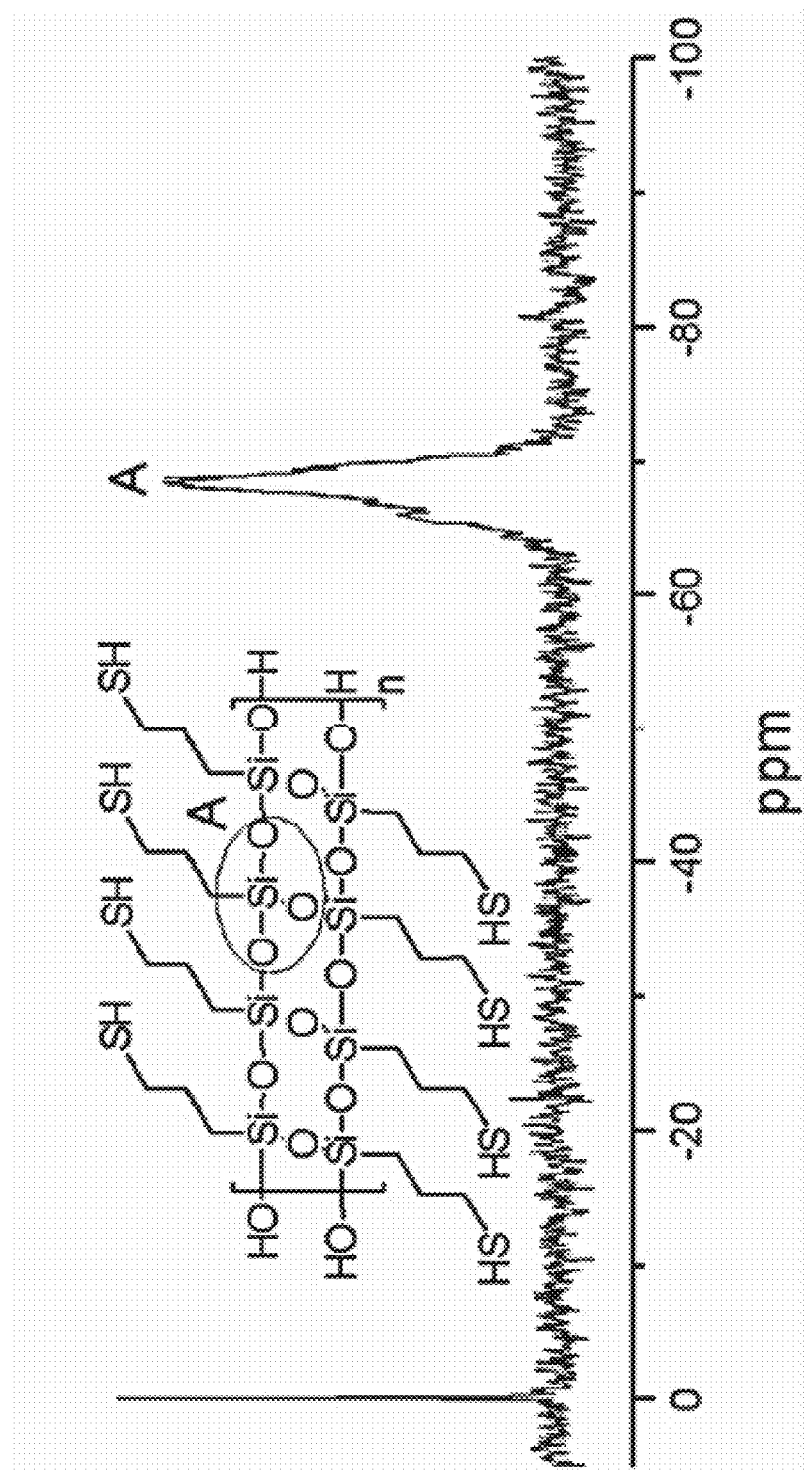
FIG. 2 shows the results of $^{29}$Si NMR analysis of mercapto-based polysilsesquioxane according to an embodiment.
Figure 3:
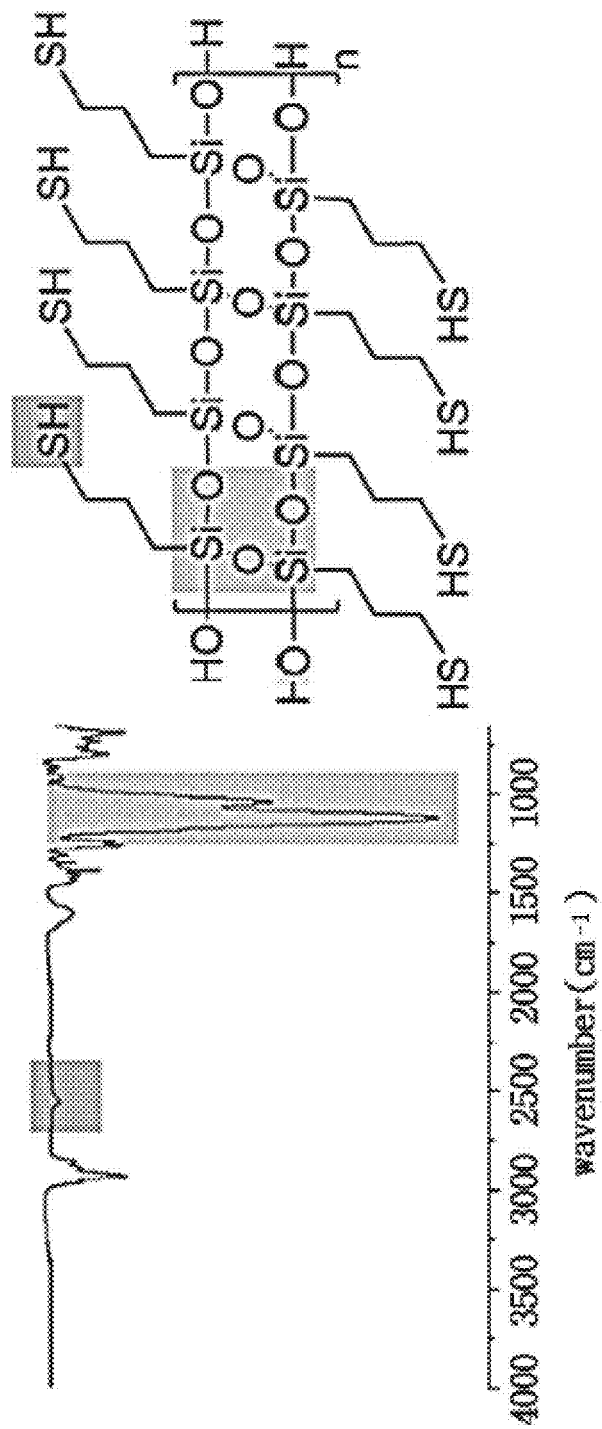
FIG. 3 shows the results of FT-IR analysis of mercapto-based polysilsesquioxane according to an embodiment.
Figure 4:
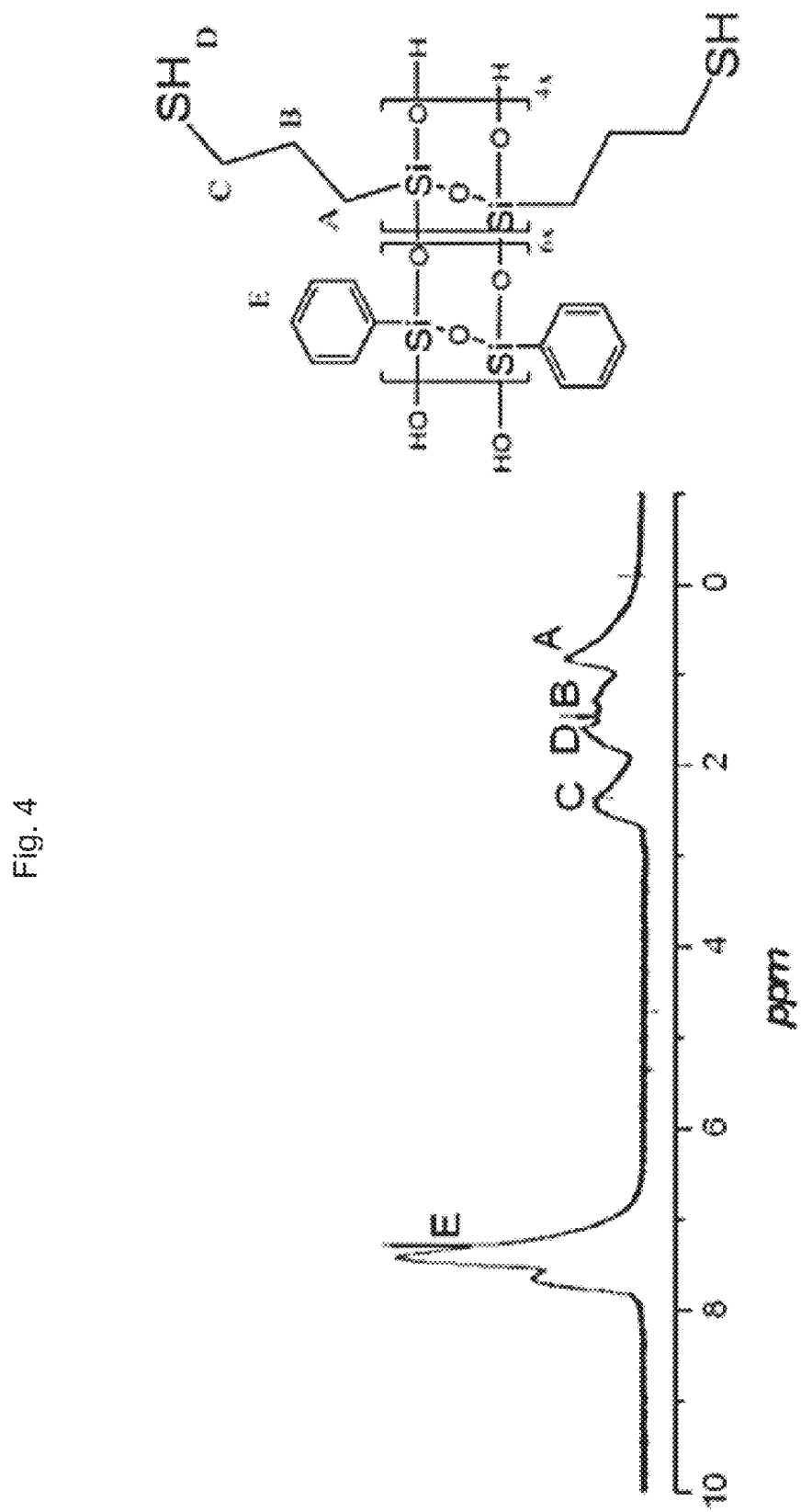
FIG. 4 shows the results of $^1$H NMR analysis of copolymerized mercapto-based polysilsesquioxane according to an embodiment.
Figure 5:
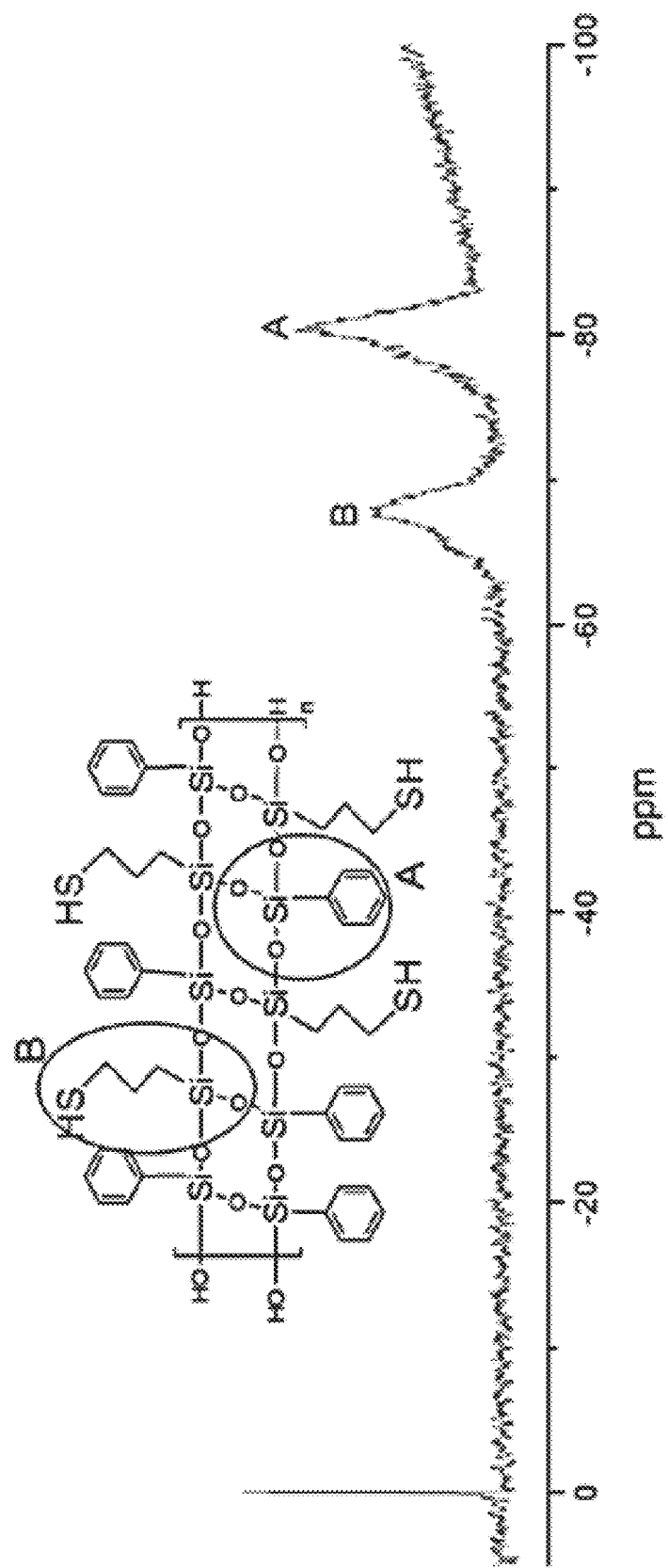
FIG. 5 shows the results of $^{29}$Si NMR analysis of copolymerized mercapto-based polysilsesquioxane according to an embodiment.
Figure 6:
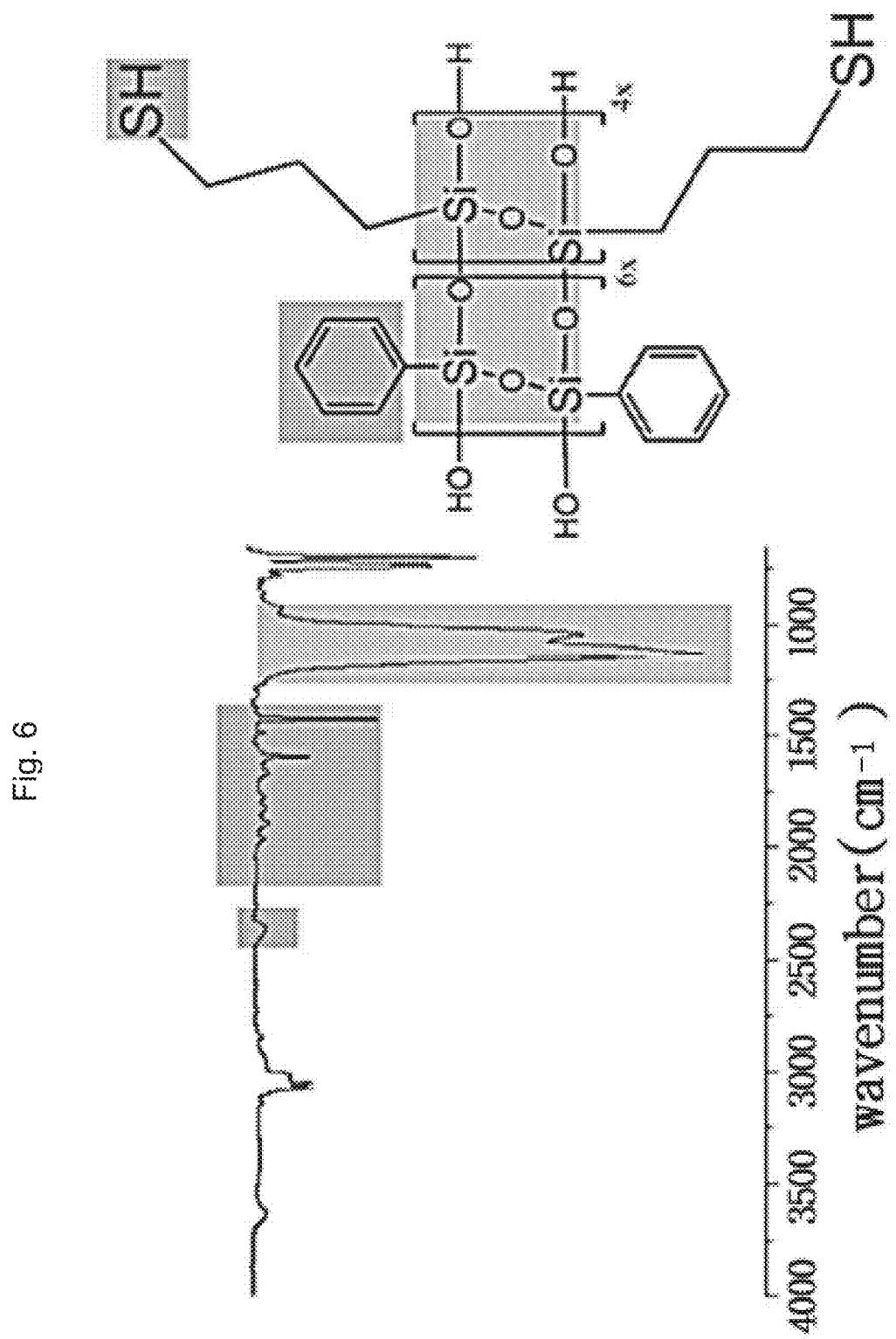
FIG. 6 shows the results of FT-IR analysis of copolymerized mercapto-based polysilsesquioxane according to an embodiment.
Figure 7:
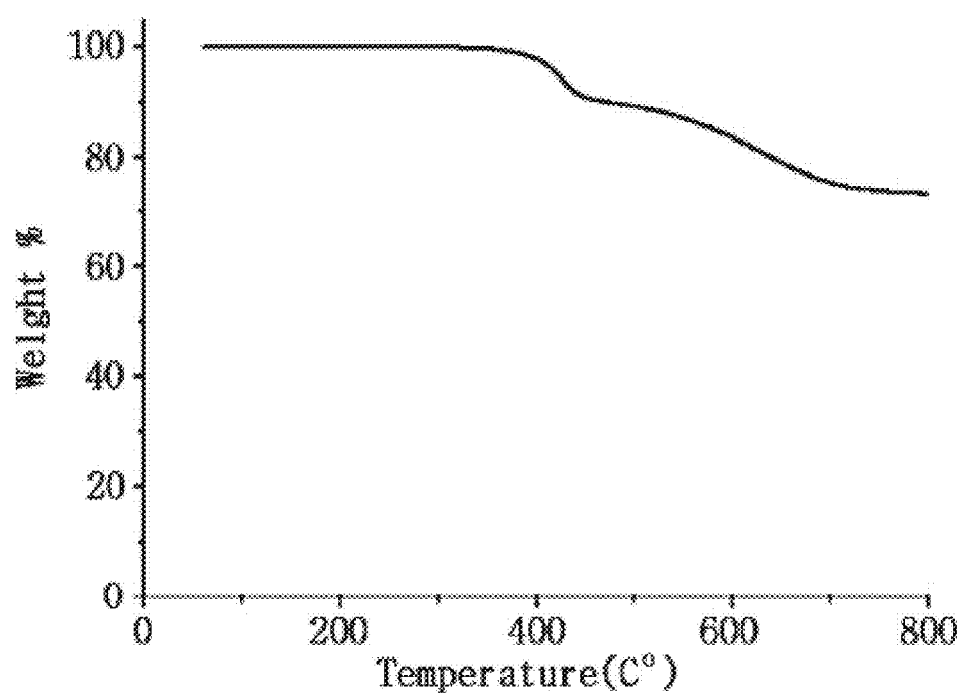
FIG. 7 shows the results of TGA of copolymerized mercapto-based polysilsesquioxane according to an embodiment.

Preparation of Ladder-Like Polymercaptopropyl silsesquioxane a) As a trialkoxy monomer, 3-mercaptopropyltrimethoxysilane (0.4 mol) is prepared. Next, tetrahydrofuran (40 g) of HPLC grade and distilled water (24 g) are prepared to provide a hydrous mixed solvent. In addition, potassium carbonate (0.2 g) is preliminarily dissolved in distilled water and the resultant solution is agitated homogeneously with tetrahydrofuran for 20 minutes.

b) 0.4 mol of 3-mercaptopropyltrimethoxysilane is added dropwise to the above hydrous solution, followed by agitation. After the completion of addition, the reaction is carried out at 25° C. for 72 hours, and the reaction mixture is purified simply through fractional distillation using methylene chloride. The ladder-like polymercaptopropylsilsesquioxane thus obtained is subjected to structural analysis using $^1$H NMR, $^{29}$Si NMR and IR spectrometry as shown in FIG. 1, FIG. 2 and FIG. 3.

Mw=11,418 (polystyrene standards)
Yield=98%

Example 2

Preparation of Ladder-Like Thiol Copolymerized Polysilsesquioxane a) As a mixed trialkoxy monomer, 3-mercaptopropyltrimethoxysilane (0.24 mol) and phenyltrimethoxysilane (0.16 mol) are prepared. Next, tetrahydrofuran (40 g) of HPLC grade and distilled water (24 g) are prepared to provide a hydrous mixed solvent. In addition, potassium carbonate (0.2 g) is preliminarily dissolved in distilled water and the resultant solution is agitated homogeneously with tetrahydrofuran for 20 minutes.

b) The mixed monomer solution of 3-mercaptopropyltrimethoxysilane (0.24 mol) and phenyltrimethoxysilane (0.16 mol) is added dropwise to the above hydrous solution, followed by agitation. After the completion of addition, the reaction is carried out at 25° C. for 72 hours, and the reaction mixture is purified simply through fractional distillation using methylene chloride. The ladder-like thiol copolymerized polysilsesquioxane thus obtained is subjected to structural analysis using $^1$H NMR, $^{29}$Si NMR, FT-IR spectrometry and TGA as shown in FIG. 4, FIG. 5, FIG. 6 and FIG. 7.

Mw=12,400 (polystyrene standards)
Yield=96%

Example 3

Figure 8:
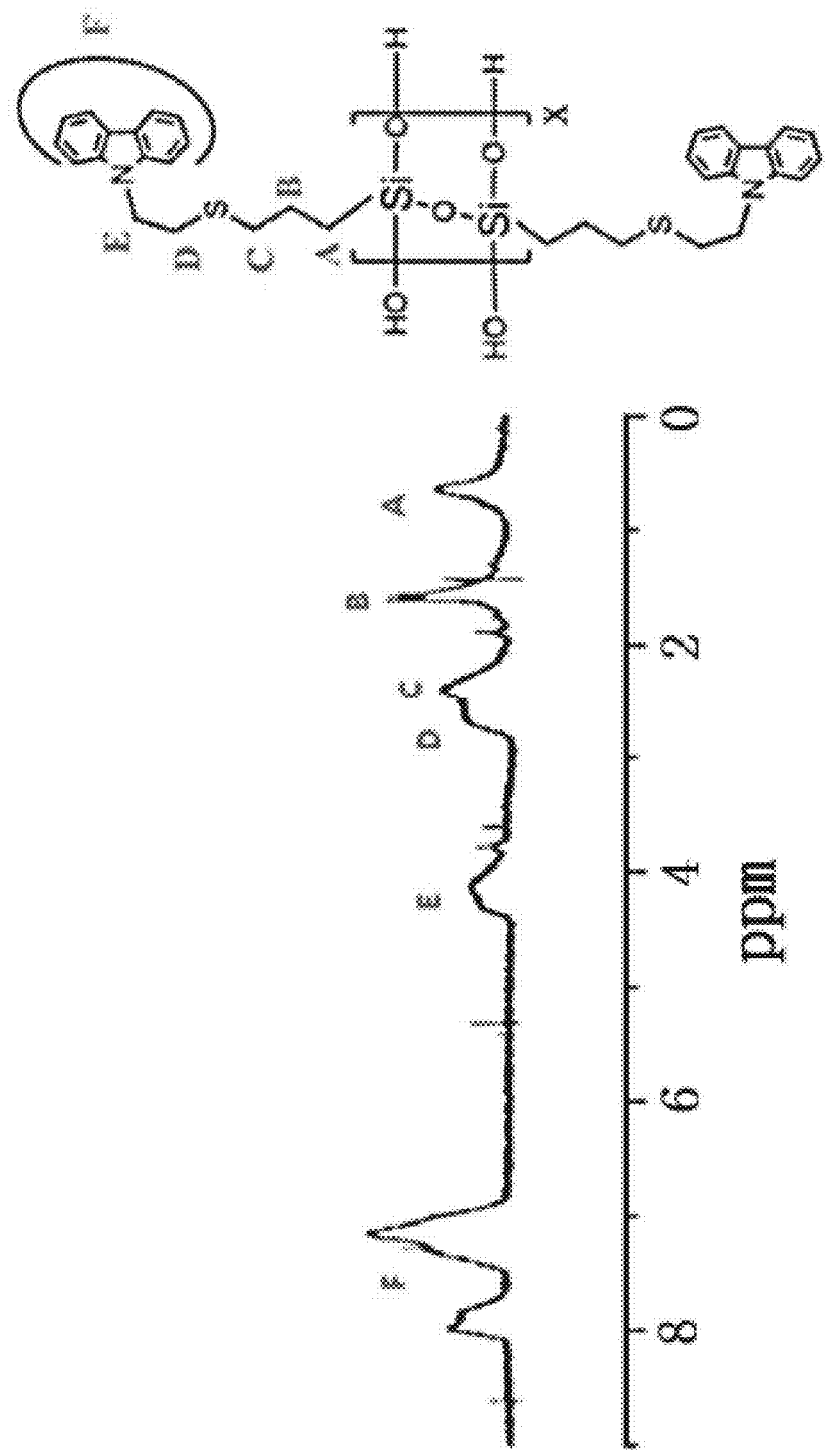
FIG. 8 shows the results of $^1$H NMR analysis of mercapto-based polysilsesquioxane obtained by thiol-ene click reaction according to an embodiment.
Figure 9:
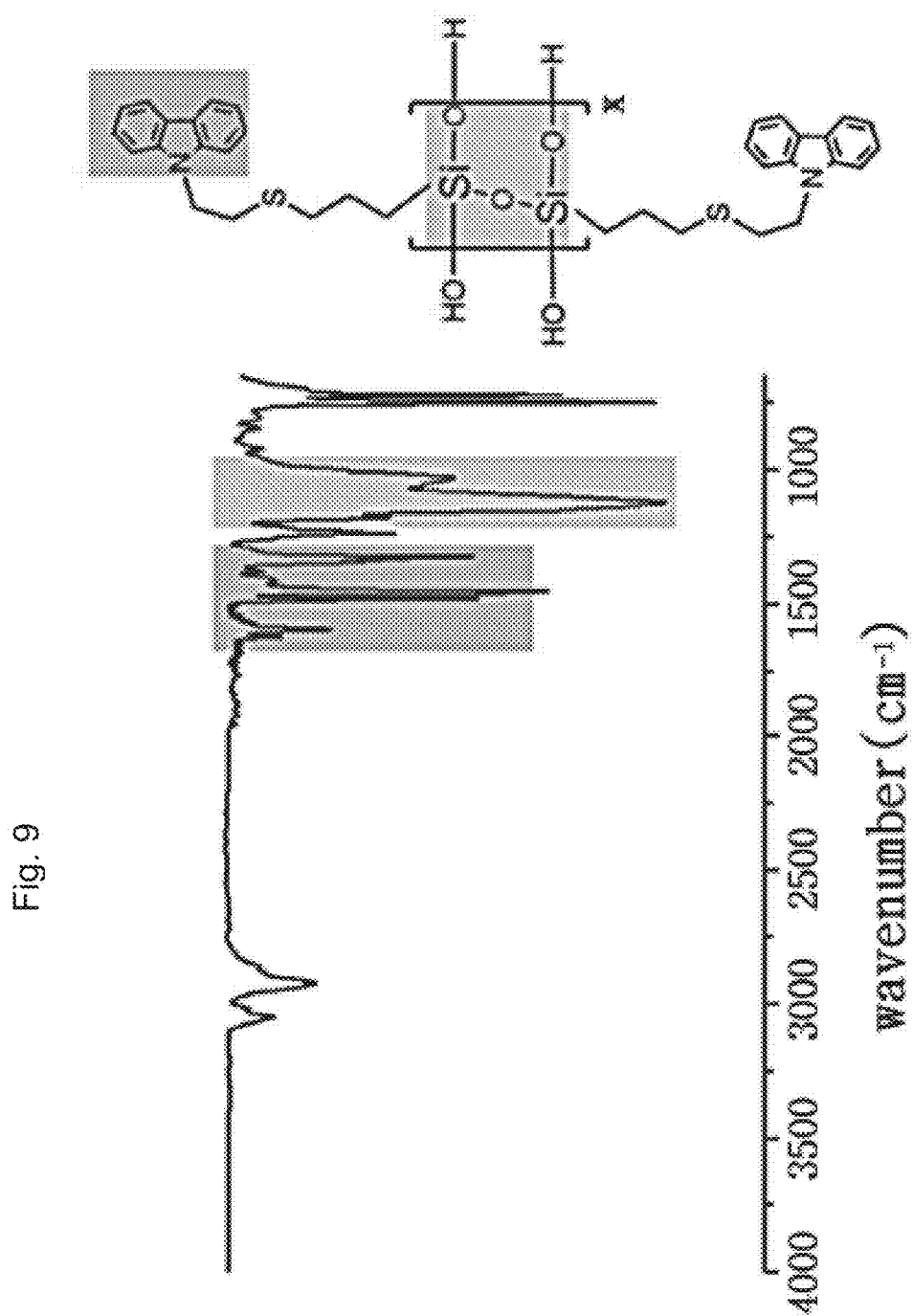
FIG. 9 shows the results of FT-IR analysis of mercapto-based polysilsesquioxane obtained by thiol-ene click reaction according to an embodiment.

Preparation of Functional Material Based on Ladder-Like Polymercaptopropylsilsesquioxane Subjected to Thiol-Ene Click Reaction Initiated by UV Irradiation The ladder-like polymercaptopropylsilsesquioxane (1 g, 1 mmol, containing thiol groups) obtained from Example 1 and 9-vinyl carbazole (0.12 g, 1 mmol) are dissolved in tetrahydrofuran (4 ml), and the reaction mixture is irradiated with UV rays. After carrying out $^1$H NMR analysis, it is determined that vinyl groups disappear. The solution thus obtained is precipitated in 50 ml of methanol and the solid content is purified through a filter. The ladder-like thioether carbazole polysilsesquioxane thus obtained is subjected to structural analysis using $^1$H NMR and FT-IR spectrometry as shown in FIG. 8 and FIG. 9.

Mw=14,400 (polystyrene standards)
Yield=96%

Example 4

Preparation of Functional Material Based on Ladder-Like Polymercaptopropylsilsesquioxane Subjected to Thiol-Ene Click Reaction Initiated by Heat The ladder-like polymercaptopropylsilsesquioxane (1 g, 1 mmol, containing thiol groups) obtained from Example 1, 9-vinyl carbazole (0.12 g, 1 mmol) and azobisisobutyronitrile (AIBN, 0.1 mmol, 16.4 mmol) as a thermal initiator are dissolved in toluene (4 ml), and the reaction solution is heated to 70° C. and agitated for 4 hours. After the lapse of 4 hours, $^1$H NMR analysis is carried out to determine that vinyl groups disappear. The solution thus obtained is precipitated in 50 ml of methanol and the solid content is purified through a filter. The ladder-like thioether carbazole polysilsesquioxane thus obtained is subjected to the same structural analysis as Example 3.

Yield=98%

Example 5

Figure 10:
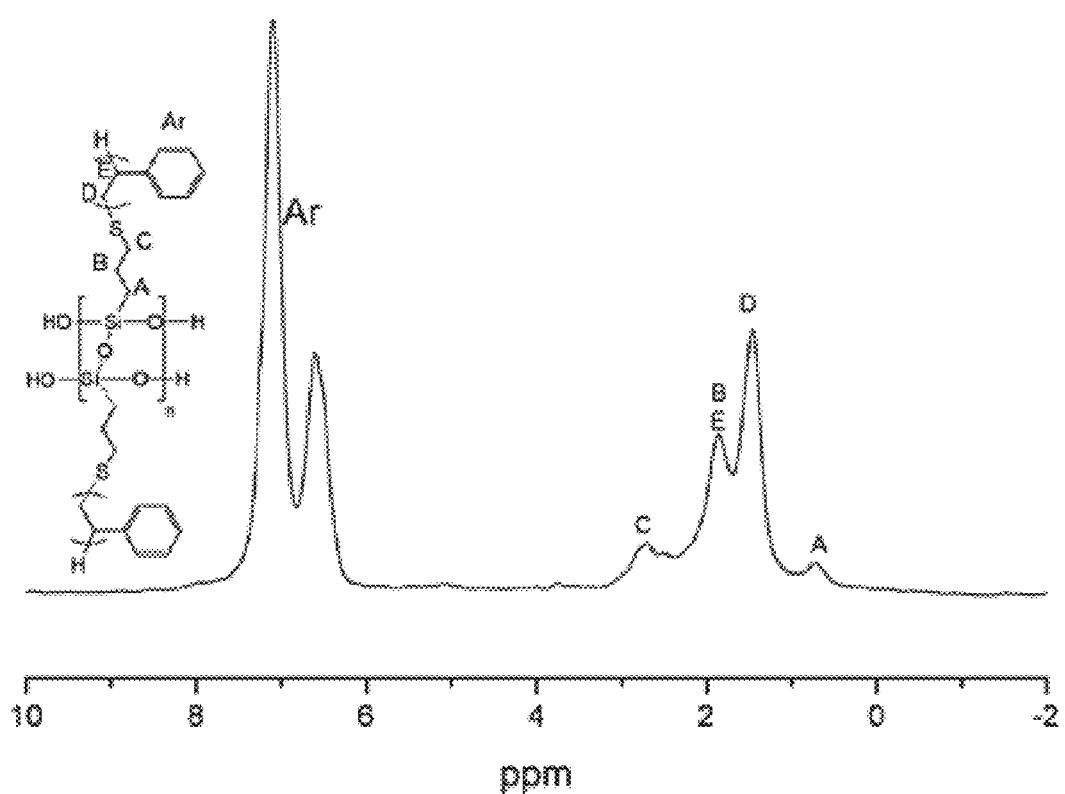
FIG. 10 shows the results of $^1$H NMR analysis of polysilsesquioxane-graft polymer obtained by thiol-ene photopolymerization according to an embodiment.
Figure 11:
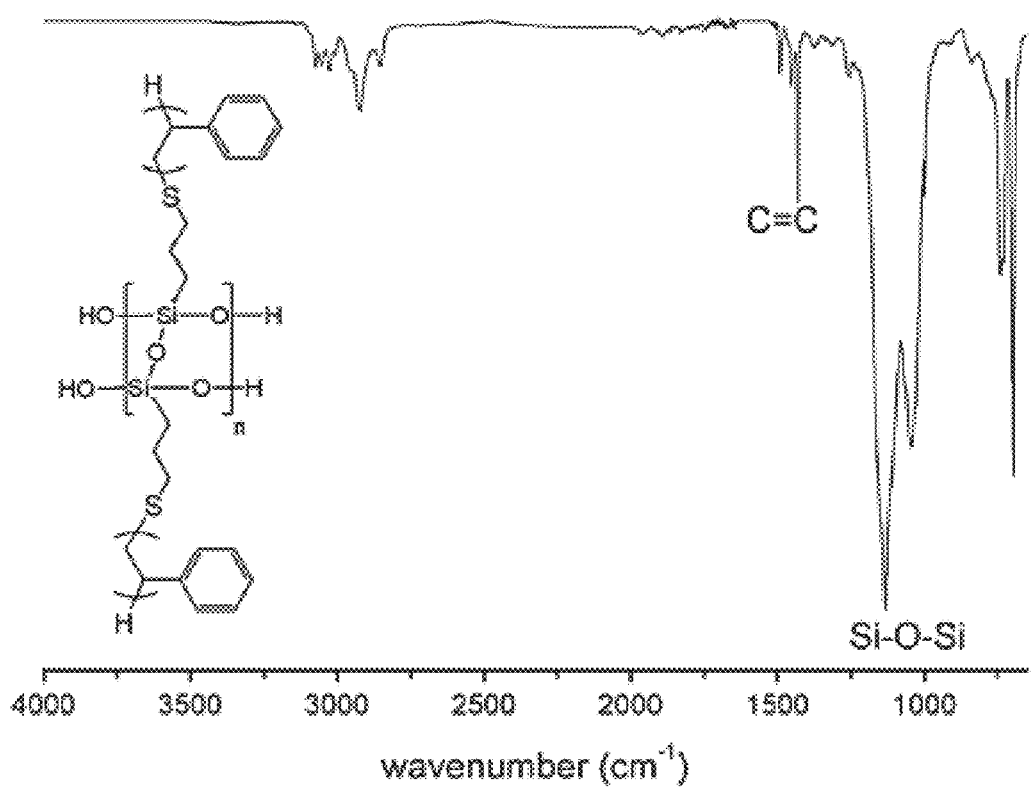
FIG. 11 shows the results of FT-IR analysis of polysilsesquioxane-graft polymer obtained by thiol-ene photopolymerization according to an embodiment.

Preparation of Ladder-Like Polysilsesquioxane-Grafted Polymer Subjected to Thiol-Ene Click Reaction Initiated by UV Irradiation The ladder-like polymercaptopropylsilsesquioxane (1 g, 1 mmol, containing thiol groups) obtained from Example 1 and styrene (10.1 g, 100 mmol) are dissolved in DMF (4 ml) as a solvent, and the reaction solution is irradiated with UV rays. After determining that vinyl groups disappear through $^1$H NMR analysis, the solution thus obtained is precipitated in 50 ml of methanol and the solid content is purified through a filter. The ladder-like polysilsesquioxane-graft-polystyrene polymer thus obtained is subjected to structural analysis using $^1$H NMR and FT-IR spectrometry as shown in FIG. 10 and FIG. 11.

Example 6

Figure 12:
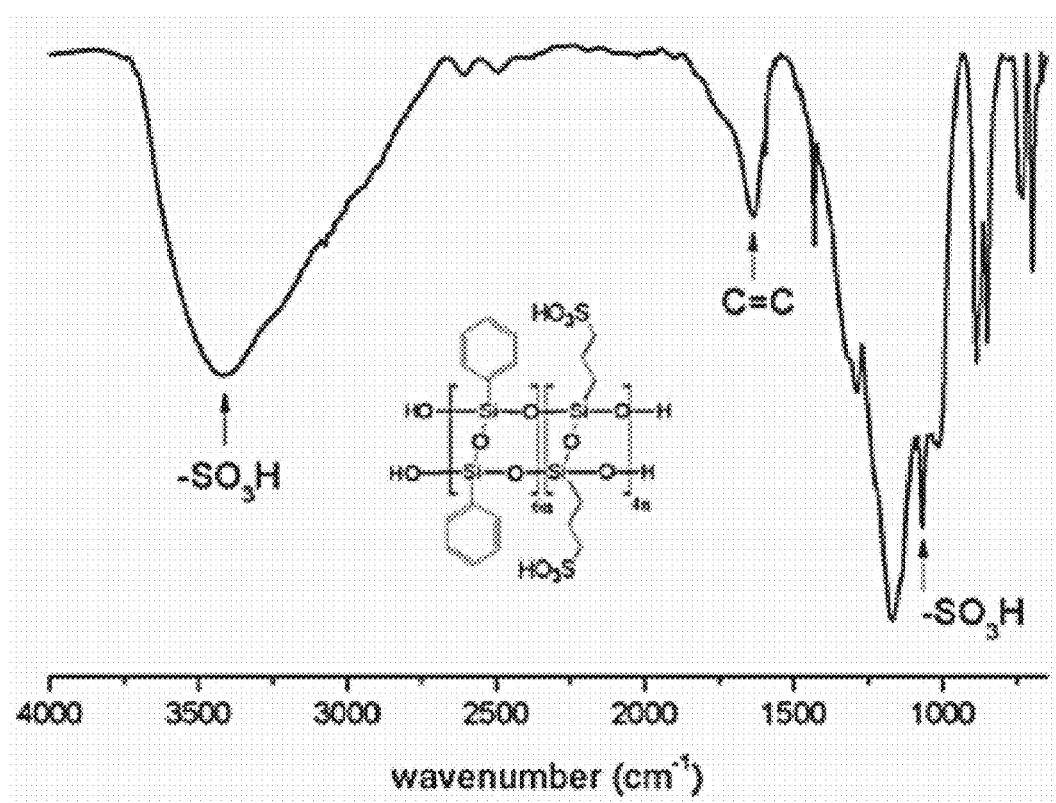
FIG. 12 shows the results of FT-IR analysis of ladder-like sulfur trioxide-containing polysilsesquioxane according to an embodiment.

Preparation of Sulfur Trioxide-Containing Functional Polysilsesquioxane Using Thiol Oxidation The ladder-like polymercaptopropylsilsesquioxane (1 g, 1 mmol, containing thiol groups) obtained from Example 2 and hydrogen peroxide (0.12 g, 1 mmol) are dissolved in tetrahydrofuran (10 ml), and the reaction solution is agitated at 60° C. for 4 hours. After determining that thiol groups disappear through $^1$H NMR analysis, tetrahydrofuran is evaporated. The white solid thus obtained is extracted with 50 ml of ether and 50 ml of weak acidic water at least three times. The ladder-like sulfur trioxide-containing functional polysilsesquioxane, after drying, is precipitated in methanol, and the solid content is purified through a filter. The ladder-like sulfur trioxide-containing functional polysilsesquioxane thus obtained is subjected to structural analysis using FT-IR spectrometry as shown in FIG. 12.

Example 7

Preparation of Composite Membrane Through Blending of Mercapto-Based Polysilsesquioxane Polymer with Polysilsesquioxane Polymer Having Double Bonds at Side Chain Thereof a) The mercapto-based polysilsesquioxane (1 g) obtained from Example 2 and methacryl-based polysilsesquioxane (1 g) are dissolved together in methyl isobutyl ketone (2 g) to obtain a transparent solution.

b) The solution thus obtained is coated onto a glass substrate treated with UV-ozone through a bar coating process, dried at room temperature for 4 hours and vacuum-dried at 60° C. for 8 hours.

c) The film thus dried is removed from the substrate and subjected to photocuring through UV irradiation at 3 J/cm$^2$, thereby providing a cured organic-inorganic composite membrane.

Figure 13:
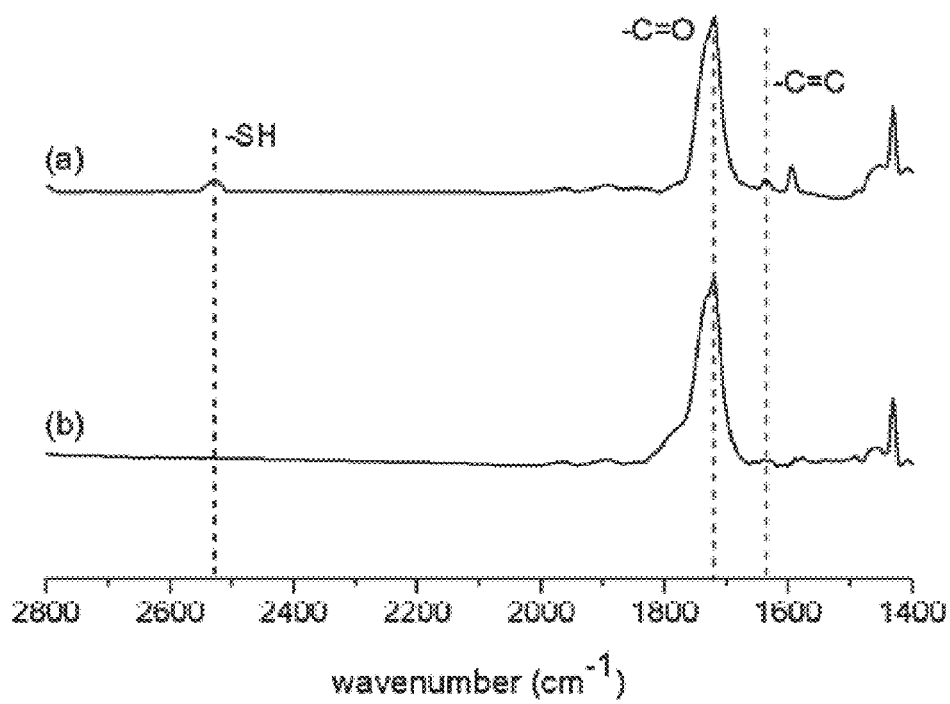
FIG. 13 shows the results of FT-IR analysis of composite membrane of mercapto-based polysilsesquioxane with methacryl-based polysilsesquioxane according to an embodiment, before and after photocuring.
Figure 14:
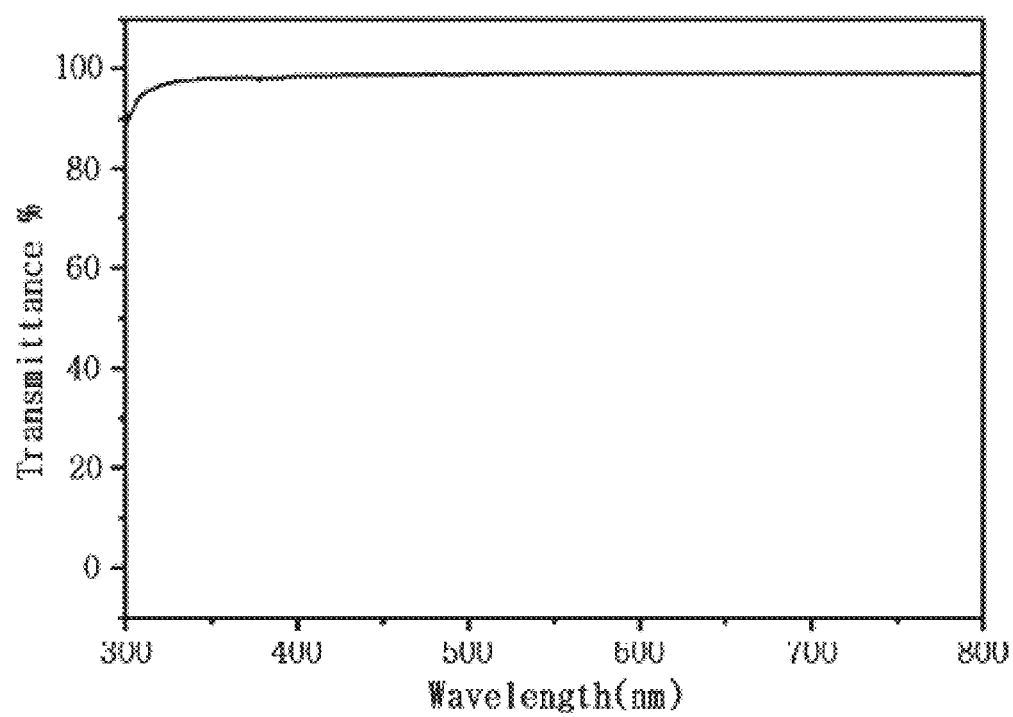
FIG. 14 shows the results of UV-Vis analysis demonstrating the transparency of composite membrane of mercapto-based polysilsesquioxane with methacryl-based polysilsesquioxane according to an embodiment.
Figure 15:
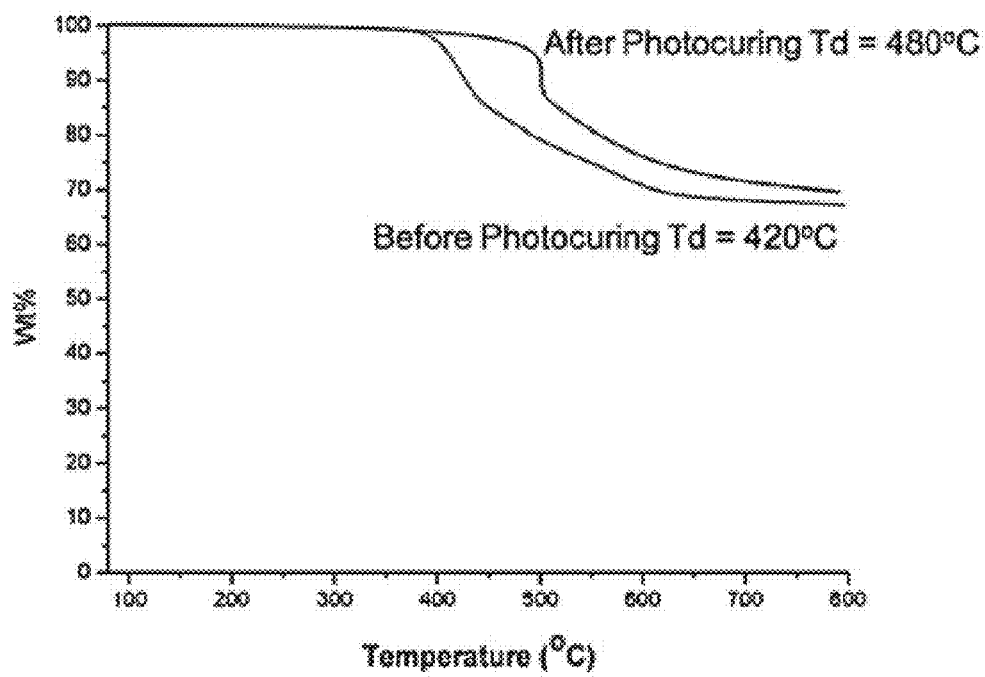
FIG. 15 shows the results of TGA of composite membrane of mercapto-based polysilsesquioxane with methacryl-based polysilsesquioxane according to an embodiment.
Figure 16:
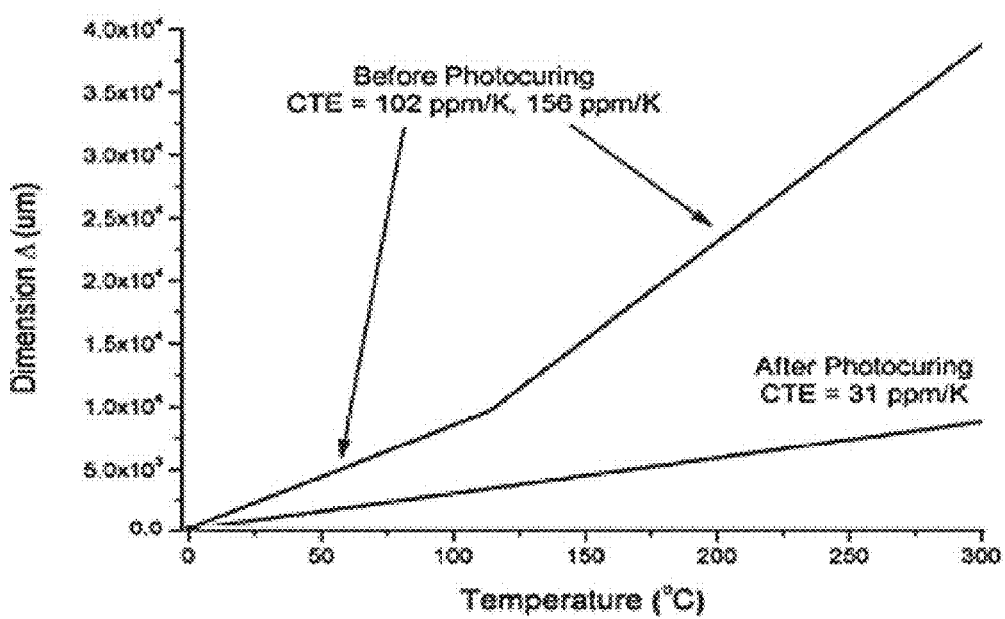
FIG. 16 shows the results of TMA of composite membrane of mercapto-based polysilsesquioxane with methacryl-based polysilsesquioxane according to an embodiment.

The curing of the composite membrane of copolymerized methacryl-based polysilsesquioxane and copolymerized mercapto-based polysilsesquioxane obtained from Example 2 is subjected to FT-IR analysis as shown in FIG. 13. In addition, the organic-inorganic composite membrane is analyzed in terms of its transparency, heat resistance and heat expansion coefficient as shown in FIG. 14, FIG. 15 and FIG. 16.

What is claimed is:

1. A thioether-containing polysilsesquioxane represented by the following Chemical Formula 1:

[Chemical Formula 1]

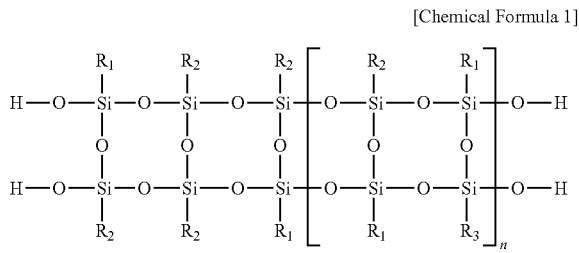

wherein, in Chemical Formula 1, each of $R_1$, $R_2$ and $R_3$ is independently an organic functional group or a thiol-ene click reaction product of a thiol aromatic group or thiol aliphatic group, and a functional reactant selected from the group consisting of olefin-based, diene-based, styrene-based, methacrylate-based, vinyl-based and allyl-based monomers, wherein the organic functional group is selected from the group consisting of an alkyl group, allyl group, vinyl group, amine group, halogen, alkyl halogen, methacryl group and acryl group;

wherein at least one of $R_1$, $R_2$ and $R_3$ is the thiol-ene click reaction product;

wherein n is an integer of 1-10,000, and wherein the thioether-containing polysilsesquioxane is a homopolymer or copolymer having a regular ladder-like structure.

2. The thioether-containing polysilsesquioxane according to claim 1, wherein at least one of $R_1$, $R_2$ and $R_3$ has mercaptopropyl group.

3. A method for preparing a ladder-like thioether-containing polysilsesquioxane as defined in claim 1, comprising carrying out thiol-ene click reaction of a mercapto-based thioether-containing polysilsesquioxane of Chemical Formula 1 with a functional reactant;

[Chemical Formula 1]

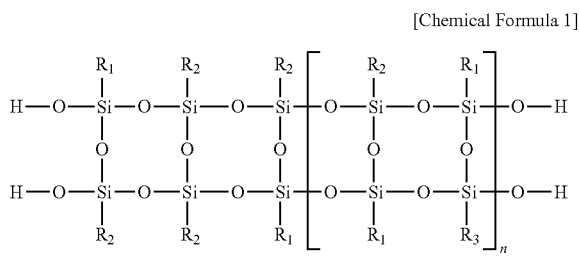

wherein, in Chemical Formula 1, each of $R_1$, $R_2$ and $R_3$ is independently selected from the group consisting of a thiol aromatic group, thiol aliphatic group and organic functional group, wherein at least one of $R_1$, $R_2$ and $R_3$ is a thiol aromatic group or thiol aliphatic group, and n is an integer of 1-10,000; and wherein the thioether-containing polysilsesquioxane is a homopolymer or copolymer having a regular ladder-like structure, wherein the organic functional group is selected from the group consisting of an alkyl group, allyl group, vinyl group, amine group, halogen, alkyl halogen, methacryl group and acryl group, and wherein the functional reactant is at least one selected from the group consisting of compounds including olefin-based, diene-based, styrene-based, acrylate-based, methacrylate-based, vinyl-based and allyl-based monomers.

4. The method for preparing a ladder-like thioether-containing polysilsesquioxane according to claim 3, wherein the functional reactant is an unsaturated hydrocarbon.

5. The method for preparing a ladder-like thioether-containing polysilsesquioxane according to claim 3, wherein the functional reactant is at least one selected from the group consisting of maleic anhydride, itaconic anhydride, citraconic anhydride and aconitic anhydride.

6. The method for preparing a ladder-like thioether-containing polysilsesquioxane according to claim 3, wherein the thiol-ene click reaction is initiated by heat or light.

7. A method for preparing a ladder-like sulfur trioxide-containing polysilsesquioxane, comprising carrying out oxidation using a mercapto based polysilsesquioxane having a thiol group (—SH) introduced to at least one side chain of polysilsesquioxane, represented by the following Chemical Formula 1:

[Chemical Formula 1]

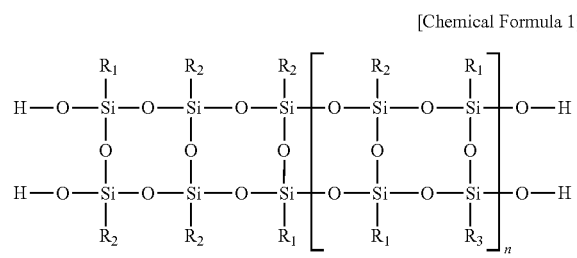

wherein, in Chemical Formula 1, each of $R_1$, $R_2$ and $R_3$ is independently selected from the group consisting of a thiol aromatic group, thiol aliphatic group and organic functional group, wherein at least one of $R_1$, $R_2$ and $R_3$ is a thiol aromatic group or thiol aliphatic group, and n is an integer of 1-10,000.

8. A method for producing a thiol-ene curable composite membrane, comprising curing a mixture of the mercapto-based polysilsesquioxane, represented by the following Chemical Formula 1:

[Chemical Formula 2]

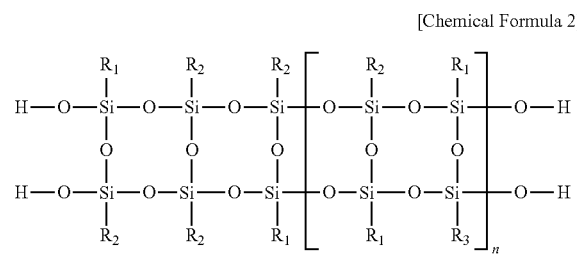

wherein, in Chemical Formula 1, each of $R_1$, $R_2$ and $R_3$ is independently selected from the group consisting of a thiol aromatic group, thiol aliphatic group, and organic functional group, wherein at least one of $R_1$, $R_2$ and $R_3$ is a thiol aromatic group or a thiol aliphatic group, and n is an integer of 1-10,000 and a polysilsesquioxane having an unsaturated hydrocarbon group.

9. The method for producing a thiol-ene curable composite membrane according to claim 8, wherein the polysilsesquioxane having an unsaturated hydrocarbon group is represented by the following Chemical Formula 2 and has at least one unsaturated hydrocarbon group introduced to the side chain thereof:

[Chemical Formula 2]

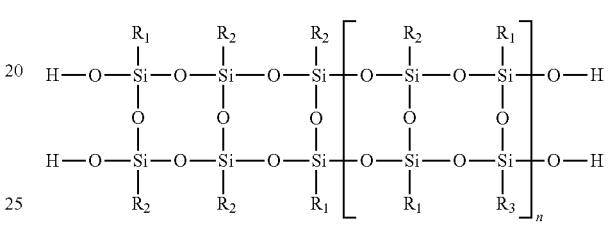

wherein, in Chemical Formula 2, at least one of $R_1$, $R_2$ and $R_3$ is independently selected from the group consisting of organic functional groups including vinyl, allyl, methacrylate and acrylate, wherein at least one of $R_1$, $R_2$ and $R_3$ is an unsaturated hydrocarbon group, and n is an integer of 1-10,000.

10. The method for producing a thiol-ene curable composite membrane according to claim 8, wherein at least one of $R_1$, $R_2$ and $R_3$ is methacryloxypropyl.

11. The method for producing a thiol-ene curable composite membrane according to claim 8, wherein said curing is carried out by photocuring or thermal curing.

12. The method for producing a thiol-ene curable composite membrane according to claim 8, wherein the polysilsesquioxane having an unsaturated hydrocarbon group is a methacrylate-based polysilsesquioxane, and the methacrylate-based polysilsesquioxane is a homopolymer or copolymer.

13. The thioether-containing polysilsesquioxane according to claim 1, wherein the functional reactant is at least one selected from the group consisting of maleic anhydride, itaconic anhydride, citraconic anhydride and aconitic anhydride.

14. The thioether-containing polysilsesquioxane according to claim 1, wherein the thiol-ene click reaction is initiated by heat or light.

* * * * *

UNITED STATES PATENT AND TRADEMARK OFFICE
CERTIFICATE OF CORRECTION

PATENT NO. : 9,487,628 B2
APPLICATION NO. : 14/550887
DATED : November 8, 2016
INVENTOR(S) : Seung Sang Hwang et al.

Page 1 of 1

It is certified that error appears in the above-identified patent and that said Letters Patent is hereby corrected as shown below:

On the Title Page

The First inventor's name, Change "Sueng Sang Hwang" to --Seung Sang Hwang--.

Signed and Sealed this
Sixth Day of June, 2017

Michelle K. Lee
*Director of the United States Patent and Trademark Office*